(12) United States Patent
Jang et al.

(10) Patent No.: US 11,196,346 B2
(45) Date of Patent: Dec. 7, 2021

(54) LLC RESONANCE CONVERTER AND CHARGING SYSTEM HAVING THE SAME

(71) Applicants: HYUNDAI MOTOR COMPANY, Seoul (KR); KIA MOTORS CORPORATION, Seoul (KR)

(72) Inventors: Hui Sung Jang, Hwaseong-si (KR); Hyun Wook Seong, Hwaseong-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 162 days.

(21) Appl. No.: 16/681,193

(22) Filed: Nov. 12, 2019

(65) Prior Publication Data
US 2020/0373845 A1    Nov. 26, 2020

(30) Foreign Application Priority Data

May 20, 2019    (KR) .......................... 10-2019-0058678

(51) Int. Cl.
| | |
|---|---|
| *H02J 7/04* | (2006.01) |
| *H02J 7/16* | (2006.01) |
| *H02M 3/335* | (2006.01) |
| *H02J 7/02* | (2016.01) |
| *H02M 1/08* | (2006.01) |
| *B60L 53/22* | (2019.01) |
| *H02M 1/42* | (2007.01) |
| *H02M 7/06* | (2006.01) |
| *H02M 1/44* | (2007.01) |
| *H02M 1/00* | (2006.01) |

(52) U.S. Cl.
CPC ......... *H02M 3/33569* (2013.01); *H02J 7/022* (2013.01); *H02M 1/083* (2013.01); *B60L 53/22* (2019.02); *H02M 1/0058* (2021.05); *H02M 1/4225* (2013.01); *H02M 1/44* (2013.01); *H02M 7/06* (2013.01)

(58) Field of Classification Search
USPC ....................... 320/138, 139, 140, 141, 142
See application file for complete search history.

(56) References Cited

U.S. PATENT DOCUMENTS

| | | | | |
|---|---|---|---|---|
| 9,356,659 | B2 * | 5/2016 | Partovi | H02J 50/12 |
| 10,079,541 | B1 * | 9/2018 | Taban | H02J 1/102 |
| 10,115,520 | B2 * | 10/2018 | Partovi | B60L 3/003 |
| 2010/0039794 | A1 * | 2/2010 | Ghanem | H05B 45/38 |
| | | | | 362/20 |
| 2017/0063251 | A1 * | 3/2017 | Ye | H02M 3/33576 |
| 2017/0282747 | A1 * | 10/2017 | Wang | B60L 11/1868 |
| 2019/0036366 | A1 * | 1/2019 | Dohmeier | B60L 53/24 |

FOREIGN PATENT DOCUMENTS

| | | | | | |
|---|---|---|---|---|---|
| DE | 102018100271 A1 | * | 7/2018 | ............. | H02J 7/025 |
| KR | 20180004680 A | * | 1/2018 | | |
| KR | 10-2018-0137056 A | | 12/2018 | | |

* cited by examiner

*Primary Examiner* — Brian Ngo
(74) *Attorney, Agent, or Firm* — Morgan, Lewis & Bockius LLP

(57) ABSTRACT

An LLC resonance converter and a charging system having the same capable of resolving excessive current generation and output voltage divergence that occur at the time of initial startup, on the basis of the characteristic of the LLC resonance converter whose output is determined by LC resonance.

16 Claims, 4 Drawing Sheets

LLC RESONANCE CONVERTER AND CHARGING SYSTEM HAVING THE SAME

CROSS REFERENCE TO RELATED APPLICATION

The present application claims the benefit of priority to Korean Patent Application No. 10-2019-0058678, filed May 20, 2019 in the Korean Intellectual Property Office, the entire contents of which is incorporated herein by reference.

TECHNICAL FIELD

The present disclosure relates to an LLC resonance converter and a charging system having the same, and more particularly, to an LLC resonance converter and a charging system having the same capable of resolving excessive current generation and output voltage divergence that occur at the time of initial startup, on the basis of the characteristic of the LLC resonance converter whose output is determined by LC resonance.

BACKGROUND

An environmentally friendly vehicle that needs to charge a battery, which is an energy source of a drive motor in a vehicle, such as an electric vehicle or a plug-in hybrid vehicle, has an on-board charger converting external AC power and outputting DC power for charging the battery.

In general, the on-vehicle charger includes a power factor correction circuit for compensating a power factor of the external AC power and outputting the power as a DC, and a DC-DC converter for converting the output of the DC by the power factor correction circuit into a DC voltage for charging the battery. Here, an LLC resonance converter, e.g., a combination of two inductors and one capacitor ("L-L-C"), using LC resonance may be employed as a DC-DC converter.

The characteristics of the LLC resonance converter are determined by a resonance frequency that is determined by two inductors and one capacitor, which are resonance tanks on the periphery of a transformer. The LLC resonance converter is advantageous in that a switching loss and a diode loss can be greatly reduced by using a resonance current generated by the two inductors and one capacitor. Further, the LLC resonance converter controls a switching frequency, not a duty of a switching element included therein, to determine an input/output relationship, and thus has a nonlinear input/output voltage gain characteristic curve. Accordingly, the LLC resonance converter has a disadvantage in that the control thereof is difficult.

In particular, it is not possible to control the LLC resonance converter in any region other than the input and output areas because the gain curve is clearly defined by LC resonance. For example, when an output terminal of a charger using the LLC resonance converter is connected to a battery to be charged by a relay at the time of initial charging, an excessive current may flow and a capacitor provided at the output terminal of the charger may be burned out. Thus, the voltage and current control of the LLC resonance converter should be performed under the no-load condition before the relay is connected. However, since the output voltage of the LLC resonance converter is not formed, the LLC resonance converter is switched to the maximum switching frequency. Accordingly, an excessive current may be generated due to LC resonance, and thereby the elements constituting the circuit may burn out. Under the no-load condition, the switching frequency should be infinite to produce the minimum load, but the limit of the maximum frequency that can be produced by a microcomputer controlling a switching element causes a problem that the output voltage continuously increases and diverges.

The contents described as the related art have been provided only to assist in understanding the background of the present disclosure and should not be considered as corresponding to the related art known to those having ordinary skill in the art.

SUMMARY

An object of the present disclosure is to provide an LLC resonance converter and a charging system having the same capable of resolving excessive current generation and output voltage divergence that occur when controlling a voltage and a current in a no-load state at the time of initial startup, on the basis of the characteristic of the LLC resonance converter whose output is determined by LC resonance.

According to an exemplary embodiment of the present disclosure, an LLC resonance converter may include: a plurality of switching elements connected to an input terminal and constituting a bridge circuit; a resonance tank receiving power formed by switching the plurality of switching elements for resonance; a transformer having a primary coil connected to the resonance tank and a secondary coil connected to a load side; a rectifier circuit connected between the secondary coil and an output terminal; an output capacitor connected to the output terminal; and a controller determining whether or not to switch the plurality of switching elements and a switching duty of the plurality of switching elements, based on an output voltage sensed value obtained by detecting a voltage at the output terminal, a voltage of a load connected to the output terminal, and a preset output voltage command value.

The LLC resonance converter may further include a relay having both ends connected to the output terminal and the load respectively, and the controller may perform short-circuiting the relay when the voltage at the output terminal is in a normal voltage range required by the load.

Before the short-circuiting the relay, the controller may adjust the switching duty to have a smaller value than a switching duty preset to be applied after the short-circuiting the relay.

When the output voltage sensed value is smaller than or equal to a preset reference value, before the short-circuiting the relay, the controller may adjust the switching duty to have a smaller value than a switching duty set to be applied in a normal state in which the load is connected to the output terminal.

The reference value may be a value which is a basis for deciding a connection state of the load based on characteristics of the load connected to the output terminal.

The load may be a battery to be charged by receiving power from the output terminal, and the reference value may correspond to a minimum voltage value which is outputted when the battery is in a normal state.

The controller may determine whether or not to switch the plurality of switching elements based on a difference between the output voltage sensed value and the output voltage command value.

The controller may perform switching the switching elements when the output voltage sensed value is smaller than a value obtained by adding a first preset margin value to the output voltage command value, and the controller may discontinue the switching the switching elements when the output voltage sensed value is equal to or larger than the value obtained by adding the first preset margin value to the output voltage command value.

The controller may resume the switching the switching elements when the output voltage sensed value decreases to a value obtained by subtracting a second preset margin value from the output voltage command value after the switching the switching elements is discontinued.

The first preset margin value may have a magnitude equal to or larger than a magnitude of a ripple of an output voltage generated in a normal state operation in which the load is connected to the output terminal after an initial startup is terminated, and may be smaller than a preset upper limit value.

According to another exemplary embodiment of the present disclosure, a charging system may include: an LLC resonance converter including a plurality of switching elements connected to an input terminal and constituting a bridge circuit, a resonance tank receiving power formed by short-circuiting and opening the plurality of switching elements for resonance, a transformer having a primary coil connected to the resonance tank and a secondary coil connected to a load side, a rectifier circuit connected between the secondary coil and an output terminal, and an output capacitor connected to the output terminal; a relay having one end connected to the output terminal; a battery connected to another end of the relay to be charged; and a controller controlling the relay to be in an open state to execute an initial charging mode when charging of the battery is initiated, and determining whether or not to switch the plurality of switching elements and a switching duty of the plurality of switching elements, based on an output voltage sensed value obtained by detecting a voltage at the output terminal in the initial charging mode, a voltage of the battery, and a preset output voltage command value.

The controller may adjust the switching duty applied in the initial charging mode to have a smaller value than a switching duty preset to be applied in a normal state in which the relay is short-circuited after the initial charging mode is terminated.

When the output voltage sensed value is smaller than or equal to a reference value in the initial charging mode, the controller may adjust the switching duty to have a smaller value than a switching duty set to be applied in a normal state in which the relay is short-circuited after the initial charging mode is terminated.

The reference value may correspond to a minimum voltage value which is outputted when the battery operates no ally.

The controller may determine whether or not to switch the switching elements based on a difference between the output voltage sensed value and the output voltage command value.

The controller may perform switching the switching elements when the output voltage sensed value is smaller than a value obtained by adding a first preset margin value to the output voltage command value, and the controller may discontinue the switching the switching elements when the output voltage sensed value is equal to or larger than the value obtained by adding the first preset margin value to the output voltage command value.

The controller may resume the switching the switching elements when the output voltage sensed value decreases to a value obtained by subtracting a second preset margin value from the output voltage command value after the switching the switching elements is discontinued.

The first preset margin value may have a magnitude equal to or larger than that of a ripple of an output voltage generated in a normal state operation in which the battery is connected to the output terminal after an initial startup is terminated, and may be smaller than a preset upper limit value.

The controller may short-circuit the relay to terminate the initial charging mode when the output capacitor is charged to a preset charging voltage in the initial charging mode.

DETAILED DESCRIPTION

Hereinafter, an LLC resonance converter and a charging system having the same according to various embodiments of the present disclosure will be described in detail with reference to the accompanying drawings.

Figure 1:
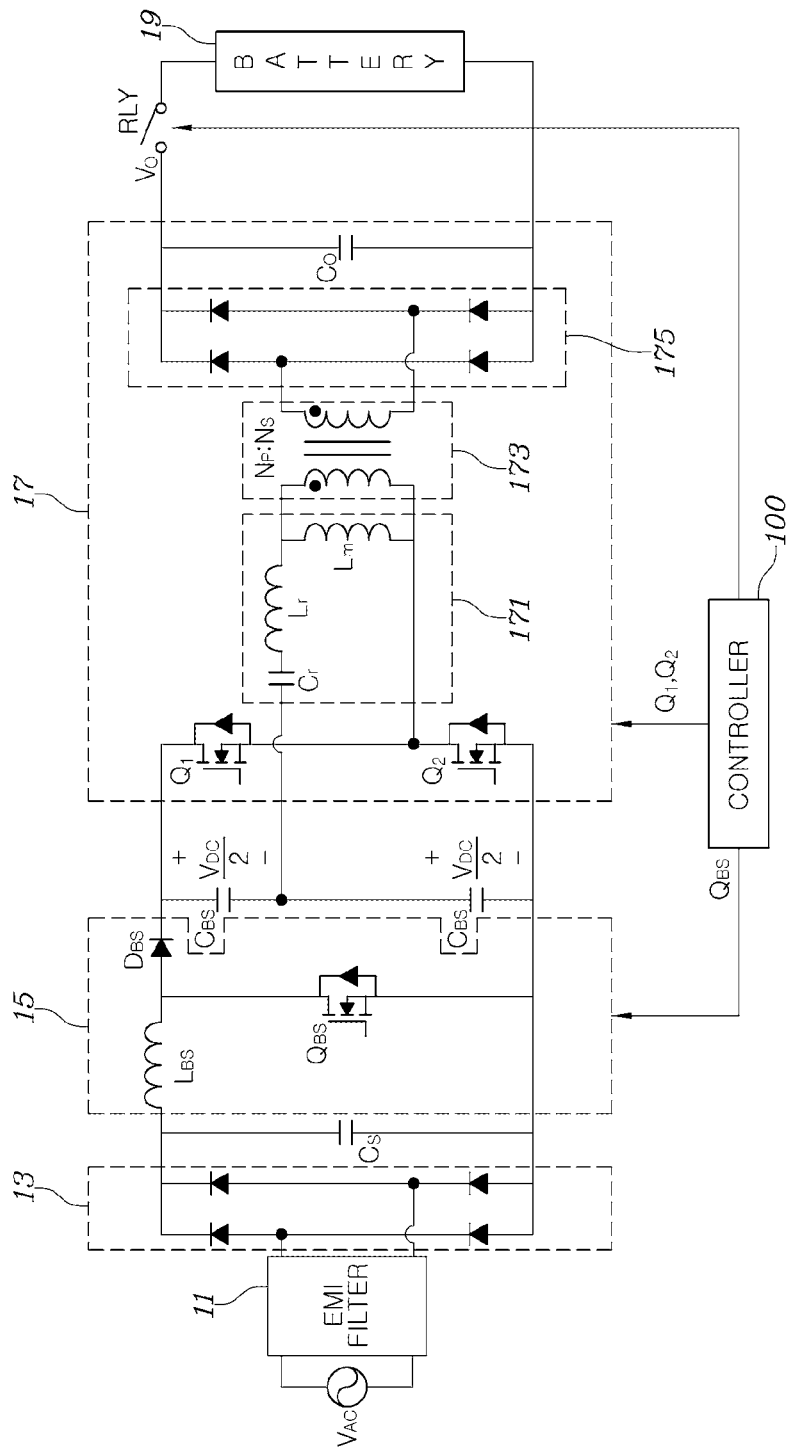
FIG. 1 is a circuit diagram of a charging system having an LLC resonance converter according to an exemplary embodiment of the present disclosure.

FIG. 1 is a circuit diagram of a charging system having an LLC resonance converter according to an exemplary embodiment of the present disclosure.

Referring to FIG. 1, the charging system having an LLC resonance converter according to an exemplary embodiment of the present disclosure may include an electro magnetic interference (EMI) filter 11 removing a noise component of external AC power, a rectifier circuit 13 rectifying the power filtered by the EMI filter 11, a smoothing capacitor Cs for smoothing an output of the rectifier circuit 13, a power factor correction circuit 15 receiving the power smoothed by the smoothing capacitor Cs and improving a power factor of the received power to output the power as DC power, an LLC resonance converter 17 converting a voltage magnitude of the DC power outputted from the power factor correction circuit 15 and outputting a charging voltage Vo for charging a battery 19, a battery 19 charged by receiving a voltage provided by the LLC resonance converter 17, and a resonance tank 171 in the LLC resonance converter 17.

The EMI filter 11, which is provided to remove noise of a high frequency component of external AC power inputted, is a circuit that has already been well known in the art. The rectifier circuit 13 may be implemented in the form of a bridge circuit implemented with a plurality of diodes, and the smoothing capacitor Cs is connected between both ends of the rectifier circuit 13. The rectifier circuit 13 and the smoothing capacitor Cs are circuit elements that have already been well known in the art as well.

The power factor correction circuit 15, which is provided to improve a power factor of AC power, may be implemented using a topology of a boost converter including an inductor $L_{BS}$, a switching element $Q_{BS}$, and a diode $D_{BS}$. An operation mechanism of such a power factor correction circuit 15 employing the topology of the boost converter is generally and widely known.

A capacitor $C_{BS}$ may be connected to an output terminal of the power factor correction circuit 15 to form a DC link terminal. In an example of FIG. 1, two DC link capacitors $C_{BS}$ having the same magnitude of capacitance may be connected in series to connect a half bridge LLC resonance converter 17 at the subsequent stage of the power factor correction circuit 15, and a terminal connecting the two DC link capacitors $C_{BS}$ may be connected to the resonance tank 171 of the half bridge LLC resonance converter 17 at the subsequent stage.

The LLC resonance converter 17 may include switching elements Q1 and Q2 connected to an input terminal $T_1$ thereof to constitute a bridge circuit, a resonance tank 171 receiving power formed by short-circuiting and opening the switching elements Q1 and Q2, a transformer 173 having a primary coil connected to the resonance tank 171 and a secondary coil connected to an output side, to which an object to be charged is connected, a rectifier circuit 175 connected to the secondary coil of the transformer 173, and an output capacitor Co connected to an output terminal $T_o$.

Figure 2:
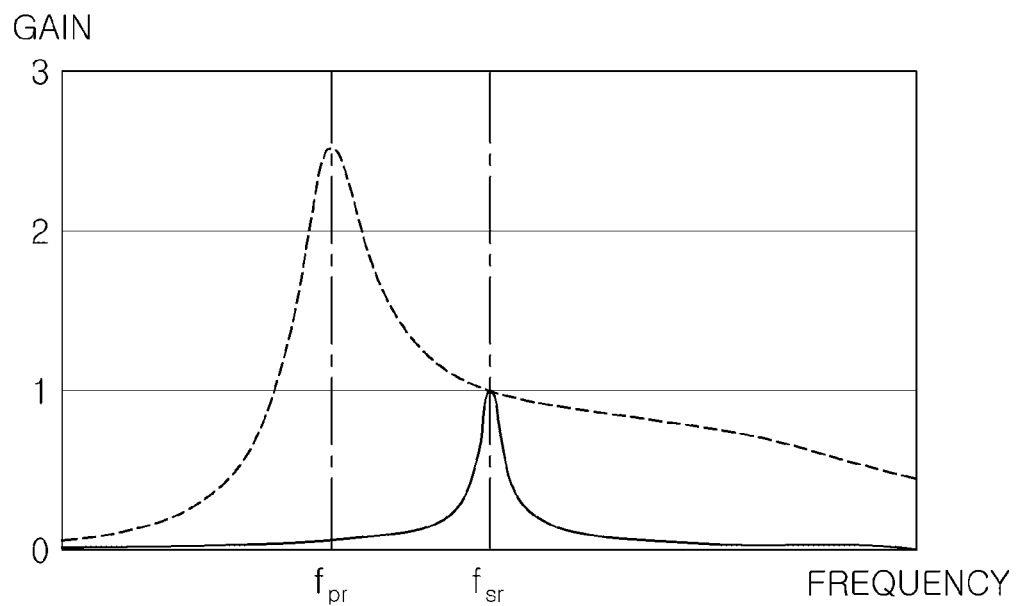
FIG. 2 is a view illustrating an input/output voltage gain curve of a general LLC resonance converter and a corresponding operation region.

FIG. 2 is a view illustrating an input/output voltage gain curve of a general LLC resonance converter and a corresponding operation region. In FIG. 2, a broken line illustrates an input/output voltage gain according to resonance caused by the inductor Lr and the capacitor Cr and is a gain curve at the time of low load, and an unbroken line illustrates an input/output voltage gain according to resonance caused by the inductors Lr and Lm and the capacitor Cr and is a gain curve at the time of high load.

Referring to FIG. 2, the LLC resonance converter may largely have three operation regions.

A first operation region is a region corresponding to a point where a switching frequency fsw of the switching elements Q1 and Q2 is equal to a resonance frequency fsr caused by the inductors Lr and Lm and the capacitor Cr. This region is a section where the switching frequency fsw is set to be equal to the resonance frequency fsr, and is a region having the smallest switching loss. This region exists in a very small part since the switching frequency fsw and the resonance frequency fsr should be completely the same.

A second operation region is a region where a switching frequency fsw of the switching elements Q1 and Q2 is larger than a resonance frequency fsr caused by the inductors Lr and Lm and the capacitor Cr. This region is a region where the switching frequency fsw is larger than the resonance frequency fsr, and is a region where a zero voltage switching (ZVS) loss may be reduced but a zero current switching loss may be generated.

A third operation region is a region where a switching frequency fsw of the switching elements Q1 and Q2 is smaller than a resonance frequency fsr caused by the inductors Lr and Lm and the capacitor Cr, and larger than a resonance frequency fpr caused by the inductor Lr and the capacitor Cr. This region is a region where the switching frequency fsw is smaller than the resonance frequency fsr and the switching loss is small, thereby improving efficiency.

As described above, the LLC resonance converter 17 may adjust a switching frequency of the switching elements Q1 and Q2 of the bridge circuit to determine an operation region and a gain and thereby determine a magnitude of the output voltage Vo. In particular, the adjustment of the switching frequency of the general LLC resonance converter 17 is achieved by controlling the switching frequency while fixing a switching duty of the switching elements Q1 and Q2 (for example, a switching duty of 50%).

However, the general method of controlling the LLC resonance converter has a problem in that the switching frequency of the switching elements is maximized when a no-load control is performed at the time of initial startup, and thereby an excessive current is generated due to the LC resonance and an output voltage continuously increases and diverges.

Accordingly, the present disclosure provides a control technique capable of solving the problem of excessive current generation and output voltage divergence due to LC resonance under the no-load condition at the time of initial startup of the LLC resonance converter.

Referring back to FIG. 1, a controller 100, which is an element for performing a control to solve the problems of the general LLC resonance converter as described above, may be implemented in the form of, e.g., a microcomputer including a processor for performing algorithm processing and calculation required for the control, and a memory for storing information required for the algorithm processing and calculation performed by the processor.

First, the controller 100 may control the switching elements Q1 and Q2 in the LLC resonance converter 17 to be turned on or off. Furthermore, the controller 100 may control a switching element $Q_{BS}$ in the power factor correction circuit 15 that is provided in the charger including the LLC resonance converter 17 and a relay RLY that determines an electrical connection state between the LLC resonance converter 17 and the battery 19. The present disclosure is to solve the problems that occur during the control in the no-load state at the time of initial startup of the LLC resonance converter. Therefore, the description will focus on the control of the LLC resonance converter 17, which is mainly performed by the controller 100.

Figure 3:
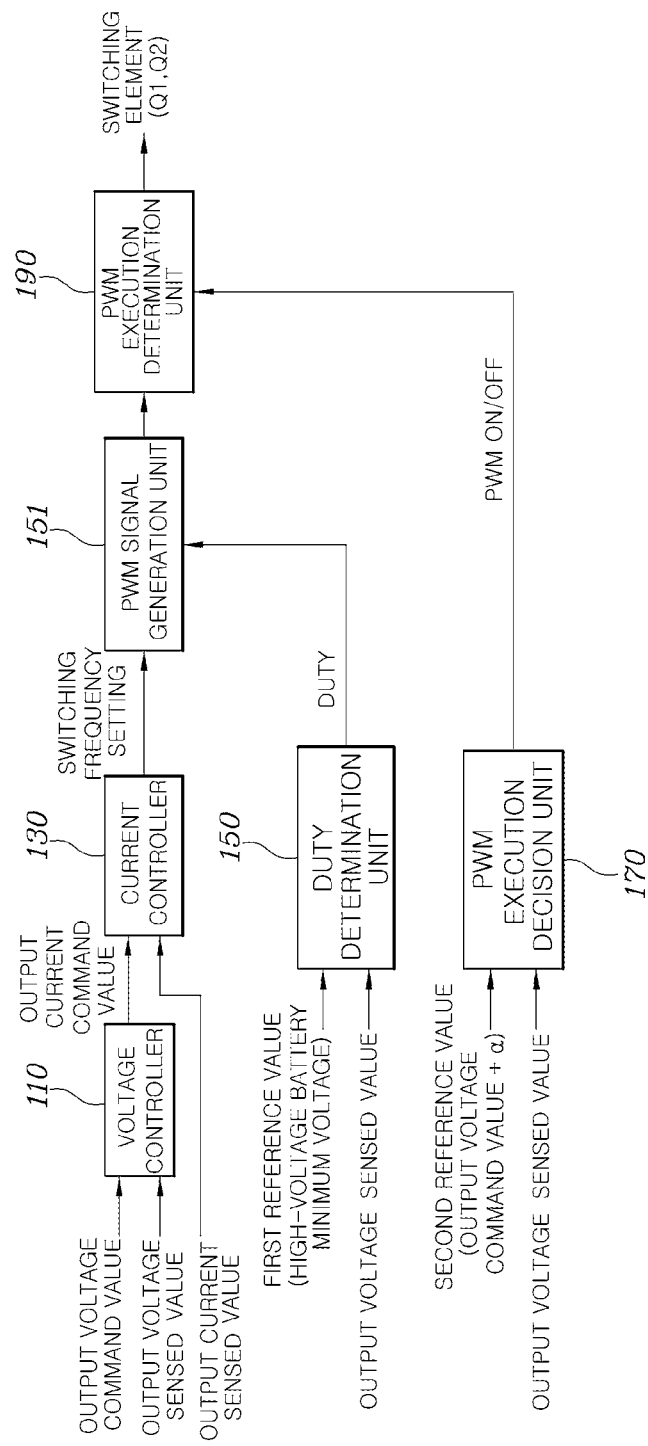
FIG. 3 is a block diagram more specifically illustrating a controller of an LLC resonance converter according to an exemplary embodiment of the present disclosure.
Figure 4:
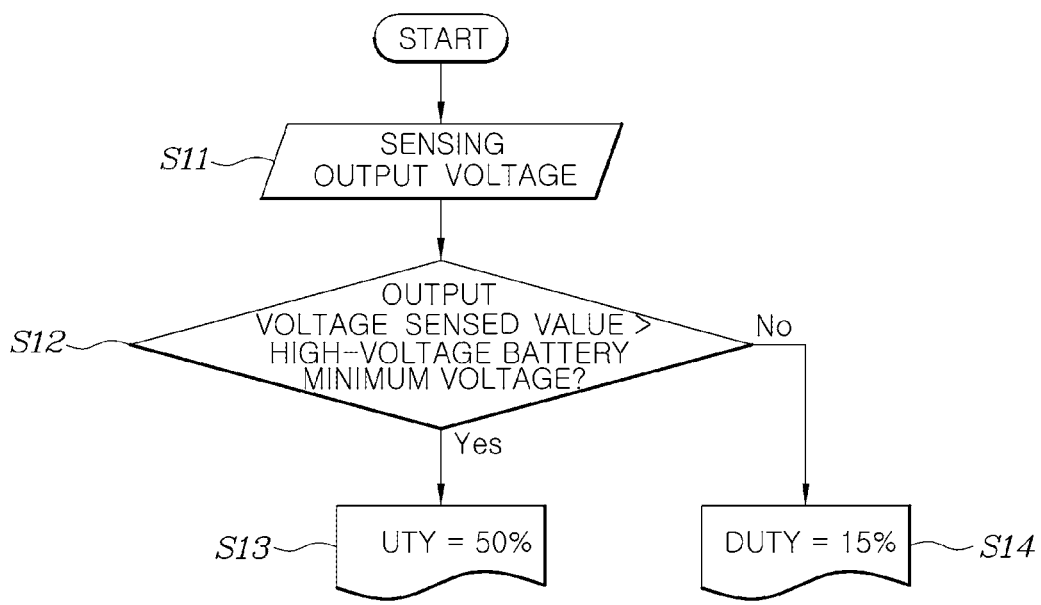
FIG. 4 is a flowchart illustrating a method of switching duty control performed by a controller of an LLC resonance converter according to an exemplary embodiment of the present disclosure.
Figure 5:
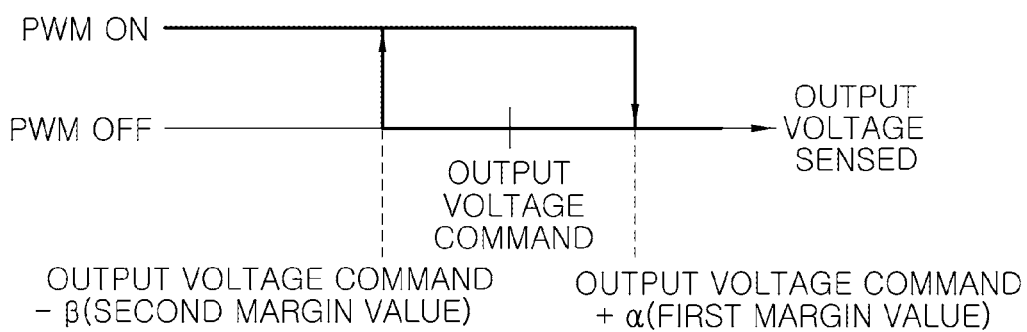
FIG. 5 is a view for explaining a method of controlling whether or not to carry out pulse width modulation performed by a controller of an LLC resonance converter according to an exemplary embodiment of the present disclosure.

FIG. 3 is a block diagram more specifically illustrating a controller of an LLC resonance converter according to an exemplary embodiment of the present disclosure. Further, FIG. 4 is a flowchart illustrating a method of switching duty control performed by a controller of an LLC resonance converter according to an exemplary embodiment of the present disclosure, and FIG. 5 is a view for explaining a method of controlling whether or not to carry out pulse width modulation performed by a controller of an LLC resonance converter according to an exemplary embodiment of the present disclosure.

Referring to FIG. 3, the controller 100 of the LLC resonance converter according to an exemplary embodiment of the present disclosure may include a voltage controller 110 and a current controller 130 determining a switching frequency of the switching elements Q1 and Q2 in the LCC resonance converter, a duty determination unit 150 determining a switching duty of the switching elements Q1 and Q2 in the LCC resonance converter, and a pulse width modulation (PWM) signal generation unit 151 generating a PWM signal having the switching frequency determined by the current controller 130 and the switching duty determined by the duty determination unit 150.

The controller 100 of the LLC resonance converter according to an exemplary embodiment of the present disclosure may include a PWM execution decision unit 170 deciding whether or not to execute switching of the switching elements Q1 and Q2 in the LCC resonance converter, and a PWM execution determination unit 190 determining whether to transmit or block the PWM signal generated by the PWM signal generation unit 151 to the switching elements Q1 and Q2 according to the result of decision by the PWM execution decision unit 170.

The controller 100 may perform various functions of the above units 150, 151, 170 and 190. The units 120, 130, 140 and 150 described below are implemented with software instructions executed on the processor of the controller 100.

The voltage controller 110 and the current controller 130 of the controller 100 are elements used for controlling a circuit device that converts power by applying general switching elements such as a converter and an inverter. More specifically, the voltage controller 110 may receive an output voltage sensed value that is obtained by detecting an output voltage of the LCC resonance converter using a sensor or the like and an output voltage command value that corresponds to a desired voltage that is to be outputted by the LCC resonance converter, and generate a particular output value for minimizing an error between the output voltage sensed value and the output voltage command value by using a general controller such as a proportional integral (PI) or proportional integral derivative (PID) controller. In the example of FIG. 3, the voltage controller 110 may generate an output current command value for minimizing an error between the output voltage sensed value and the output voltage command value. The current controller 130 may receive the output current command value provided from the voltage controller 110 and an output current sensed value detected at the output terminal $T_o$ of the LLC resonance converter through a sensor or the like, and determine a switching frequency of the switching elements Q1 and Q2 in the LLC resonance converter to minimize an error between the output current sensed value and the output current command value by using a general controller such as a proportional integral (PI) or proportional integral derivative (PID) controller.

The voltage controller 110 and the current controller 130 are general techniques in the related art for controlling the switching elements Q1 and Q2 such that the output voltage of the LLC resonance converter is a desired value (output voltage command value). Thus, the additional detailed description will be omitted.

As illustrated in FIG. 4, the duty determination unit 150 of the controller 100 compares the output voltage sensed value, which has been obtained by detecting an output voltage of the LLC resonance converter through a sensor or the like (S11), with a preset reference value (S12), and then determines a switching frequency of the switching elements Q1 and Q2 as a first switching duty (for example, 50%) as usual when the output voltage sensed value is larger than the reference value (S13), or determines a switching frequency of the switching elements Q1 and Q2 as a second switching duty (for example, 15%), which has a smaller value than the first switching duty, when the output voltage sensed value is smaller than or equal to the reference value (S14).

In an exemplary embodiment of the present disclosure, in order to prevent excessive current generation due to LC resonance in the state in which the output voltage of the LLC resonance converter is not formed, when the output voltage sensed value is smaller than the specific reference value, that is, when the output voltage is not formed or the output voltage is low, the duty determination unit 150 changes the duty of the switching elements Q1 and Q2 in the LLC resonance converter to have a smaller value than the preset basic duty. According to an exemplary embodiment of the present disclosure, an LC resonance current from the resonance tank in the LLC resonance converter may not reach the maximum value, and only a low current is transmitted, thereby preventing internal elements from being burned out due to the excessive current.

Here, the reference value input to the duty determination unit 150 and compared with the output voltage sensed value may be set as a value that is a basis for deciding the no-load state at the time of initial startup of the LCC resonance converter. That is, the reference value may be a value that is a basis for deciding the no-load state based on the characteristics of the load connected to the output terminal $T_o$ of the LLC resonance converter after the initial startup state is terminated.

For example, taking into account that the output of the LLC resonance converter is connected to the battery 19 to be charged in the charging system including an LLC resonance converter, when the detected output voltage value of the LLC resonance converter is smaller than the minimum voltage value that can be outputted when the battery 19 normally operates as defined in the specifications of the battery 19, the LLC resonance converter may be estimated to be in a no-load state. That is, the reference value used in the duty determination unit 150 may be a minimum voltage value that can be outputted by the battery in the normal state.

The first switching duty is a duty of a PWM signal provided to the internal switching elements Q1 and Q2 in a state in which the output of the LLC resonance converter is normally connected to the load. For example, the first switching duty may previously be determined to be approximately 50%. The second switching duty, which has a smaller value than the first switching duty, may vary depending on an LC resonance amount of the resonance tank 171 in the LLC resonance converter. For example, the second switching duty may be determined to be a value making the highest value of the LC resonance to be smaller than a value of the rated current preset based on the specifications of the LLC resonance converter under the condition that the output voltage of the LLC resonance converter is 0 V.

The PWM signal generation unit 151 of the controller 100 generates a PWM signal having a switching frequency determined by the current controller 130 and a switching duty determined by the duty determination unit 150. This PWM signal is provided to gates of the switching elements Q1 and Q2 in the LLC resonance converter to adjust the switching elements Q1 and Q2 to be turned on or off, and thus may be referred to as a gate signal.

The PWM execution decision unit 170 of the controller 100 may receive the output voltage sensed value and a preset second reference value and decide whether or not to execute switching of the switching elements Q1 and Q2 in the LCC resonance converter. Referring to FIG. 5, the PWM execution decision unit 170 compares a output voltage sensed value, which has been obtained by detecting an output voltage of the LLC resonance converter through a sensor or the like (S11), with a preset reference value (output voltage command value+first margin value), and decides to continue the PWM driving of the switching elements Q1 and Q2 in the LLC resonance converter when the output voltage sensed value is smaller than the reference value. Reversely, when the output voltage sensed value is greater than or equal to the reference value (output voltage command value+first margin value), the PWM execution decision unit 170 decides to discontinue the switching of the switching elements Q1 and Q2 in the LLC resonance converter.

The reference value compared with the output voltage sensed value at the time of initial startup in the PWM execution decision unit 170 may be a value obtained by adding a first predetermined margin value (α) to the output voltage command value. The first margin value (α) may be determined based on a magnitude of a ripple of the output voltage generated in the normal state operation in which the load is connected to the output terminal $T_o$ of the LLC resonance converter after the initial startup of the LLC resonance converter. This is because the voltage at the output terminal $T_o$ in the normal state may be a value of an output voltage plus a ripple, and thus a value obtained by adding a value corresponding to the ripple to the output voltage should be considered to be normal. More specifically, the first margin value (α) may be determined to be equal to or greater than a magnitude of the ripple of the output voltage generated in the normal state operation in which the load is connected to the output terminal $T_o$ of the LLC resonance converter after the initial startup of the LLC resonance converter, and equal to or smaller than a preset upper limit value which does not have a bad influence on the converter or the parts constituting the load.

The PWM execution decision unit 170 may resume the switching of the switching elements Q1 and Q2, when the output voltage sensed value decreases to a value obtained by subtracting a second predetermined margin value (β) from the output voltage command value, after the switching of the switching elements Q1 and Q2 is discontinued because the output voltage sensed value at the time of initial startup is equal to or greater than a value obtained by adding the first predetermined margin value (α) to the output voltage command value.

Here, the first margin value (α) and the second margin value (β) may be a positive value properly selected through an experimental method.

The PWM execution determination unit 190 of the controller 100 transmits or blocks a PWM signal generated by the PWM signal generation unit 151 to the switching elements Q1 and Q2 according to the result of decision by the PWM execution decision unit 170 to continue or discontinue the switching of the switching elements Q1 and Q2.

According to an exemplary embodiment of the present disclosure, the controller 100 is capable of solving the output voltage divergence problem by blocking a PWM signal provided to the switching elements Q1 and Q2 in the LLC resonance converter, when the output voltage continuously increases and becomes larger than a predetermined reference value (output voltage command value+α) due to the limit of the maximum switching frequency that can be provided to the switching elements at the time of initial startup of the LLC resonance converter.

As described above, the various embodiments of the present disclosure enable a capacitor at the output terminal of the LLC resonance converter to be charged at the time of initial startup under the no-load condition, by reducing a duty of the PWM signal provided to the LLC resonance converter at the time of initial startup of the LLC resonance converter with a voltage/current in the no-load state to interrupt excessive current generation, and by blocking the PWM signal to prevent divergence when the output voltage of the LLC resonance converter increases to a predetermined level or above.

As illustrated in FIG. 1, when the LLC resonance converter is applied to the charging system, once the operation of the charging system is initiated, the controller 100 adjusts a duty of the PWM signal for controlling the switching elements Q1 and Q2 in the LLC resonance converter 17 and determines whether or not to transmit the PWM signal as explained through FIGS. 3 to 5, with the relay RLY being in an open state, thereby making it possible to stably charge the output capacitor Co of the LLC resonance converter 17 in the no-load state before the relay RLY is short-circuited. When the charging of the output capacitor Co is terminated and the output voltage of the LLC resonance coverer 17 is formed at the output terminal $T_o$ of the LLC resonance converter 17 as a preset voltage required by the load (battery), the controller 100 short-circuits the relay RLY, so that charging power may be stably supplied to the battery 19.

According to the LLC resonance converter and the charging system having the same as described above, it is possible to prevent excessive current generation due to LC resonance in the process of controlling an output voltage and a current in a no-load state at the time of initial startup of the LLC resonance converter and resolve output voltage divergence due to the limited switching frequency.

According to the LLC resonance converter and the charging system having the same as described above, it is also possible to stably charge a capacitor at an output terminal of the LLC resonance converter in a no-load state at the time of initial startup of the LLC resonance converter.

Effects that can be obtained from the present disclosure are not limited to what have been mentioned above, and other effects that have not been mentioned above may be clearly understood by those skilled in the art from the following description.

Although the present disclosure has been shown and described with respect to specific embodiments, it will be apparent to those having ordinary skill in the art that the present disclosure may be variously modified and altered without departing from the spirit and scope of the present disclosure as defined by the following claims.

What is claimed is:

1. An LLC resonance converter, comprising:
a plurality of switching elements connected to an input terminal and constituting a bridge circuit;
a resonance tank receiving power formed by switching the plurality of switching elements for resonance;
a transformer having a primary coil connected to the resonance tank and a secondary coil connected to a load side;
a rectifier circuit connected between the secondary coil and an output terminal;
an output capacitor connected to the output terminal;
a controller determining whether or not to switch the plurality of switching elements and a switching duty of the plurality of switching elements, based on an output voltage sensed value obtained by detecting a voltage at the output terminal, a voltage of a load connected to the output terminal, and a preset output voltage command value; and
a relay having both ends connected to the output terminal and the load respectively,
wherein the controller performs short-circuiting the relay when the voltage at the output terminal is in a normal voltage range required by the load, and
wherein, before the short-circuiting the relay, the controller adjusts the switching duty to have a smaller value than a switching duty preset to be applied after the short-circuiting the relay.

2. The LLC resonance converter of claim 1, wherein, when the output voltage sensed value is smaller than or equal to a preset reference value, the controller adjusts the switching duty to have a smaller value than a switching duty set to be applied in a normal state in which the load is connected to the output terminal.

3. The LLC resonance converter of claim 2, wherein the reference value is a value which is a basis for deciding a connection state of the load based on characteristics of the load connected to the output terminal.

4. The LLC resonance converter of claim 3, wherein the load is a battery to be charged by receiving power from the output terminal, and the reference value corresponds to a minimum voltage value which is outputted when the battery is in a normal state.

5. The LLC resonance converter of claim 1, wherein the controller determines whether or not to switch the plurality of switching elements based on a difference between the output voltage sensed value and the output voltage command value.

6. The LLC resonance converter of claim 1, wherein the controller performs switching the switching elements when the output voltage sensed value is smaller than a value obtained by adding a first preset margin value to the output voltage command value, and the controller discontinues the switching the switching elements when the output voltage sensed value is equal to or larger than the value obtained by adding the first preset margin value to the output voltage command value.

7. The LLC resonance converter of claim 6, wherein the controller resumes the switching the switching elements when the output voltage sensed value decreases to a value obtained by subtracting a second preset margin value from the output voltage command value after the switching the switching elements is discontinued.

8. The LLC resonance converter of claim 6, wherein the first preset margin value has a magnitude equal to or larger than a magnitude of a ripple of an output voltage generated in a normal state operation in which the load is connected to the output terminal after an initial startup is terminated, and is smaller than a preset upper limit value.

9. A charging system, comprising:
an LLC resonance converter including a plurality of switching elements connected to an input terminal and constituting a bridge circuit, a resonance tank receiving power formed by short-circuiting and opening the plurality of switching elements for resonance, a transformer having a primary coil connected to the resonance tank and a secondary coil connected to a load side, a rectifier circuit connected between the secondary coil and an output terminal, and an output capacitor connected to the output terminal;
a relay having one end connected to the output terminal;
a battery connected to another end of the relay to be charged; and
a controller controlling the relay to be in an open state to execute an initial charging mode when charging of the battery is initiated, and determining whether or not to switch the plurality of switching elements and a switching duty of the plurality of switching elements, based on an output voltage sensed value obtained by detecting a voltage at the output terminal in the initial charging mode, a voltage of the battery, and a preset output voltage command value,
wherein the controller adjusts the switching duty applied in the initial charging mode to have a smaller value than a switching duty preset to be applied in a normal state in which the relay is short-circuited after the initial charging mode is terminated.

10. The charging system of claim 9, wherein, when the output voltage sensed value is smaller than or equal to a preset reference value, the controller adjusts the switching duty to have a smaller value than a switching duty set to be applied in a normal state in which the relay is short-circuited after the initial charging mode is terminated.

11. The charging system of claim 10, wherein the reference value corresponds to a minimum voltage value which is outputted when the battery operates normally.

12. The charging system of claim 9, wherein the controller determines whether or not to switch the switching elements based on a difference between the output voltage sensed value and the output voltage command value.

13. The charging system of claim 9, wherein the controller performs switching the switching elements when the output voltage sensed value is smaller than a value obtained by adding a first preset margin value to the output voltage command value, and the controller discontinues the switching the switching elements when the output voltage sensed value is equal to or larger than the value obtained by adding the first preset margin value to the output voltage command value.

14. The charging system of claim 13, wherein the controller resumes the switching the switching elements when the output voltage sensed value decreases to a value obtained by subtracting a second preset margin value from the output voltage command value after the switching the switching elements is discontinued.

15. The charging system of claim 13, wherein the first preset margin value has a magnitude equal to or larger than that of a ripple of an output voltage generated in a normal state operation in which the battery is connected to the output terminal after an initial startup is terminated, and is smaller than a preset upper limit value.

16. The charging system of claim 9, wherein the controller short-circuits the relay to terminate the initial charging mode when the output capacitor is charged to a preset charging voltage in the initial charging mode.

* * * * *